US006313821B1

(12) United States Patent
Mizuno

(10) Patent No.: US 6,313,821 B1
(45) Date of Patent: Nov. 6, 2001

(54) IMAGE DISPLAY DEVICE FOR AUTOMATICALLY ADJUSTING CONTRAST OF DISPLAY IMAGE

(75) Inventor: Yoshiaki Mizuno, Kanagawa-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/427,336

(22) Filed: Oct. 26, 1999

(30) Foreign Application Priority Data

Oct. 28, 1998 (JP) .................................. 10-306514

(51) Int. Cl.[7] .............................. G09G 3/36; G02F 1/133
(52) U.S. Cl. ................................... 345/101; 349/72
(58) Field of Search .................... 345/36, 45, 76, 345/84, 87, 88, 94, 97, 101; 349/72

(56) References Cited

U.S. PATENT DOCUMENTS

| 4,917,469 | * | 4/1990 | Ross ....................................... 350/332 |
| 5,027,111 | * | 6/1991 | Davies et al. .......................... 340/784 |
| 5,029,982 |   | 7/1991 | Nash .................................. 350/331 T |
| 5,252,955 | * | 10/1993 | Davies et al. ........................... 345/87 |
| 5,416,495 | * | 5/1995 | Davies et al. ........................... 345/87 |
| 5,515,074 | * | 5/1996 | Yamamoto ............................ 345/101 |
| 5,900,851 | * | 5/1999 | Toffolo et al. .......................... 345/76 |
| 5,929,833 | * | 7/1999 | Koshobu et al. ..................... 345/101 |
| 5,936,604 | * | 8/1999 | Endou .................................. 345/101 |
| 6,115,021 | * | 9/2000 | Nonomura et al. .................. 345/101 |
| 6,211,852 | * | 4/2001 | Oono et al. ........................... 345/102 |

* cited by examiner

Primary Examiner—Bipin Shalwala
Assistant Examiner—Jeff Piziali
(74) Attorney, Agent, or Firm—Brinks Hofer Gilson & Lione

(57) ABSTRACT

In order to adjust a contrast of a display unit of the image display device, the image display device includes a temperature sensor, a controller, and a storage unit. The storage unit stores data representing the relationships between control voltages and the temperatures under the control voltages for optimizing the contrast of the image. The controller, to which detected temperatures by the temperature sensor are input, controls an input time interval of the detected temperatures while it adjusts a contrast of an image on a display unit. The controller acquires the detected temperatures at each first time interval for a predetermined period of time subsequent to the start of supplying power to the display unit, and supplies the display unit with the control voltages corresponding to temperatures, equivalent to the acquired temperatures, and which are represented by the data stored in the storage unit. After the predetermined period of time, the detected temperatures are acquired at each second time interval longer than each first time interval.

3 Claims, 5 Drawing Sheets

IMAGE DISPLAY DEVICE FOR AUTOMATICALLY ADJUSTING CONTRAST OF DISPLAY IMAGE

BACKGROUND OF THE INVENTION

1. Field of the Invention

The present invention relates to image display devices, and more particularly to an image display device suitable for a personal computer, a word processor, or the like which uses a liquid crystal display as a display unit.

2. Description of the Related Art

Recently personal computers, word processors, and the like have been progressively miniaturized. Accordingly, image display devices employing liquid crystal displays (hereinafter referred to as a LCD) as a display unit, such as in miniaturized and light-weight notebook-sized personal computers, are often used outdoors.

A conventional image display device is described below with reference to FIGS. 6 and 7. FIG. 6 shows a block diagram of the conventional image display device. The image display device includes a manually adjusting operation unit 31, a contrast adjusting unit 32, and a display unit 33.

The manually adjusting operation unit 31, which includes push button switches 31a and 31b, manually adjusts a contrast of the image display device. This operation unit 31 is connected to the contrast adjusting unit 32.

The contrast adjusting unit 32 supplies a control voltage for determining the contrast to the display unit 33. This unit 32 includes a variable resistor and the like (not shown). For example, by operating push button switches 31a and 31b in the manually adjusting operation unit 31, the resistance of the variable resistor in the contrast adjusting unit 32 varies, which as a result causes the contrast of the display unit 33 to vary.

The display unit 33 displays an image signal from, for example, a personal computer (not shown). In addition to the image signal from the personal computer, the control voltage and the like are input from the contrast adjusting unit 32 to the display unit 33.

For example, the relationship between temperature of the display unit 33 and contrast, when using the LCD as the display unit 33, is shown in FIG. 7. When a constant control voltage is supplied to the LCD, the contrast decreases in accordance with an increase in the temperature; when the temperature of the display unit 33 is constant, the contrast decreases in accordance with a decrease in the control voltage.

When the temperature decreases from $T_1$ to $T_2$ under the constant control voltage $V_1$, the contrast increases from $C_1$ (corresponding to a point $P_1$) to $C_2$ (corresponding to a point $P_2$). To obtain a contrast $C_1$ at temperature $T_2$, a control voltage $V_2$, which is lower than the control voltage $V_1$, must be supplied to the display unit 33.

Accordingly, by operating the push button switch 31b in the manually adjusting operation unit 31 so as to decrease the control voltage to the control voltage $V_2$, a standard contrast $C_1$ (corresponding to a point $P_3$) is obtained.

On the other hand, when the contrast $C_1$ (corresponding to the point $P_3$) is obtained at temperature $T_2$ under the constant control voltage $V_2$, the contrast decreases to $C_3$ (corresponding to a point $P_4$) in accordance with an increase in the temperature to $T_1$. In this case, by operating the push button switch 31a in the manually adjusting operation unit 31 so as to increase the control voltage to the control voltage $V_1$, a standard contrast $C_1$ (corresponding to the point $P_1$) is obtained.

As describe above, a change in the temperature under the constant control voltage affects the contrast due to the LCD temperature characteristics. Therefore, whenever the temperature changes, a user is inconvenienced since the user must manually adjust the contrast so that the contrast of the image displayed on the display unit 33 has the most preferable level.

SUMMARY OF THE INVENTION

Accordingly, it is an object of the present invention to provide an image display device for solving the problems discussed above.

To this end, according to one aspect of the present invention, the image display device includes a temperature sensor, a controller to which detected temperatures obtained by the temperature sensor are input, and controls an input time interval of the detected temperatures while it adjusts a contrast of an image displayed on a display unit and a storage unit. The storage unit stores data representing the relationships between control voltages and the temperatures of the display unit under the control voltages for optimizing the contrast of the image. The controller acquires the detected temperatures from the temperature sensor at each first time interval for a predetermined period of time subsequent to the start of supplying power to the display unit, and supplies the display unit with the control voltages corresponding to temperatures which are equivalent to the acquired temperatures, and which are represented by the data stored in the storage unit. After the predetermined period of time, the detected temperatures are acquired at each second time interval longer than each first time interval. It is an object of the present invention to provide an image display device with the above arrangement. By doing this, the image display device with its ability of displaying the image with the best contrast can be used right after the power is supplied to the display unit.

In an image display device according to a first aspect of the present invention, a predetermined standard temperature difference may be stored in the storage unit. When the detected temperatures are input from the temperature sensor to the controller at each second time interval, and a temperature difference between a presently detected temperature at each input time and the temperature detected just before the presently detected temperature is greater than the standard temperature difference, the detected temperature may be immediately input to the controller at each first time interval for the predetermined period of time. It is another object of the present invention to provide an image display device with the above arrangement. By doing this, the image display device with its ability of displaying the image with the best contrast can be used regardless of a rapid temperature change in the display unit which a change of its operating environment may bring.

In an image display device according to a first aspect of the present invention, the controller may include a manually adjusting operation unit for manually adjusting the contrast of the image. The manually adjusting operation unit may modify data representing the relationships between the control voltages and the temperatures of the display unit under the control voltages for optimizing the contrast of the image, thereby supplying the display unit with the control voltages corresponding to temperatures which are equivalent to the acquired temperatures and which are represented by the modified data stored in the storage unit which represents the relationships between the control voltages and the temperatures of the display unit under the control voltages for optimizing the contrast of the image. It is a further object of the present invention to provide an image display device with the above arrangement. By doing this, even though a user adjusts the contrast of the image to his or her preference, the image display device with its ability of automatically adjusting to the best contrast can be used.

DESCRIPTION OF THE PREFERRED EMBODIMENT

Figure 1:
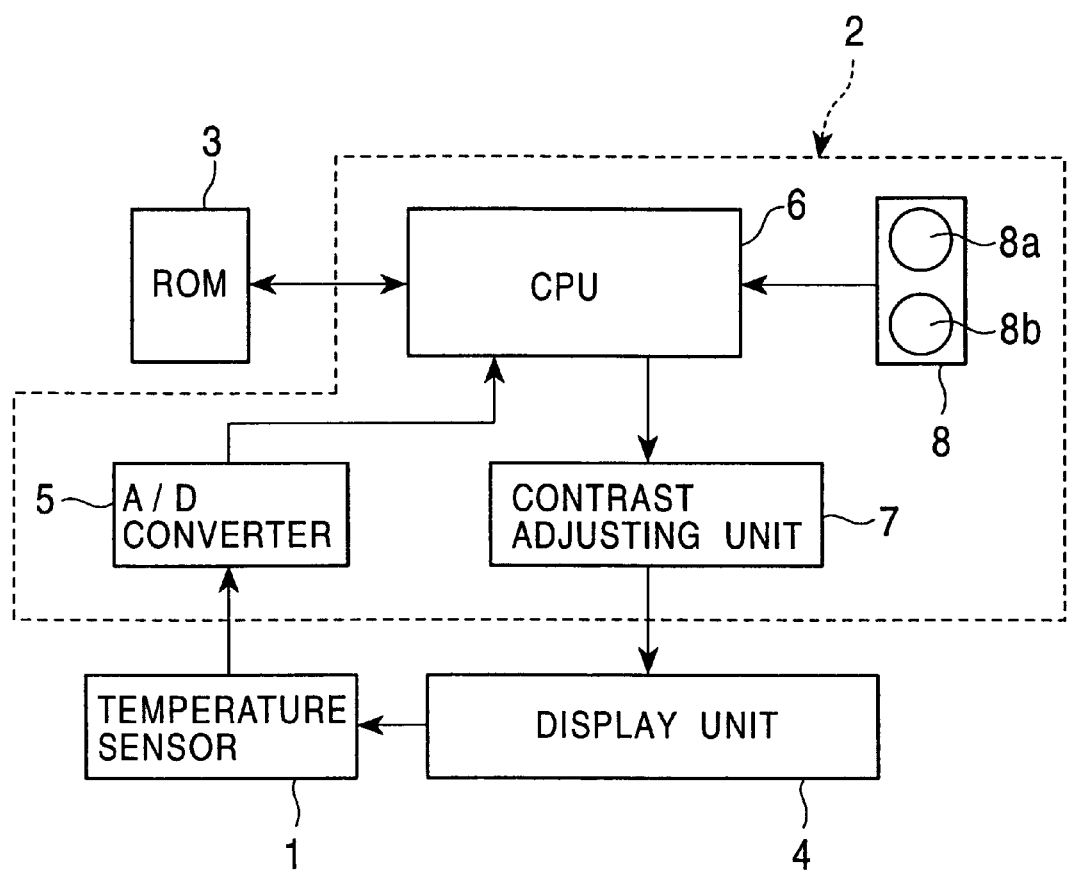
FIG. 1 is a block diagram of an image display device according to an embodiment of the present invention.

An image display device of the present invention is described below in detail with reference to FIGS. 1 through 5. FIG. 1 shows a block diagram of the image display device which includes a temperature sensor 1, a controller 2, a storage device (referred to as ROM hereinafter) 3, and a display unit 4.

The temperature sensor 1 is provided in the proximity of the center of the display unit 4 (not shown) for detecting the temperature of the display unit 4, and is connected to an analog-to-digital converter (hereinafter referred to as an A/D converter) 5 in the controller 2. The temperature of the display unit 4 detected by the temperature sensor 1 is input to the A/D converter 5.

The controller 2 automatically controls the contrast of the display unit 4 in response to the input temperature signal from the temperature sensor 1 corresponding to the temperature of the display unit 4. The controller 2 also includes a central processing unit (CPU) 6, a contrast adjusting unit 7, and a manually adjusting operation unit 8.

The CPU 6 is connected to the ROM 3, the A/D converter 5, the contrast adjusting unit 7, and the manually adjusting operation unit 8. The A/D converter 5 converts the input temperature signal to a digital signal (the temperature represented by the converted digital signal is hereinafter referred to as a detected temperature) which, in turn, is input to the CPU 6.

The contrast adjusting unit 7 includes a variable resistor (not shown). As the resistance of the variable resistor varies in accordance with control by the CPU 6, a control voltage supplied to the display unit 4 varies.

The display unit 4 displays an image signal from for example, a personal computer (not shown). Other than the image signal from the personal computer, the control voltage and the like are input from the contrast adjusting unit 7 to the display unit 4. The contrast of the display unit 4 is adjusted in accordance with the control voltage supplied from the contrast adjusting unit 7.

The manually adjusting operation unit 8 manually adjusts the contrast of the display image to a preferable level, and includes push button switches 8a and 8b.

Figure 2:
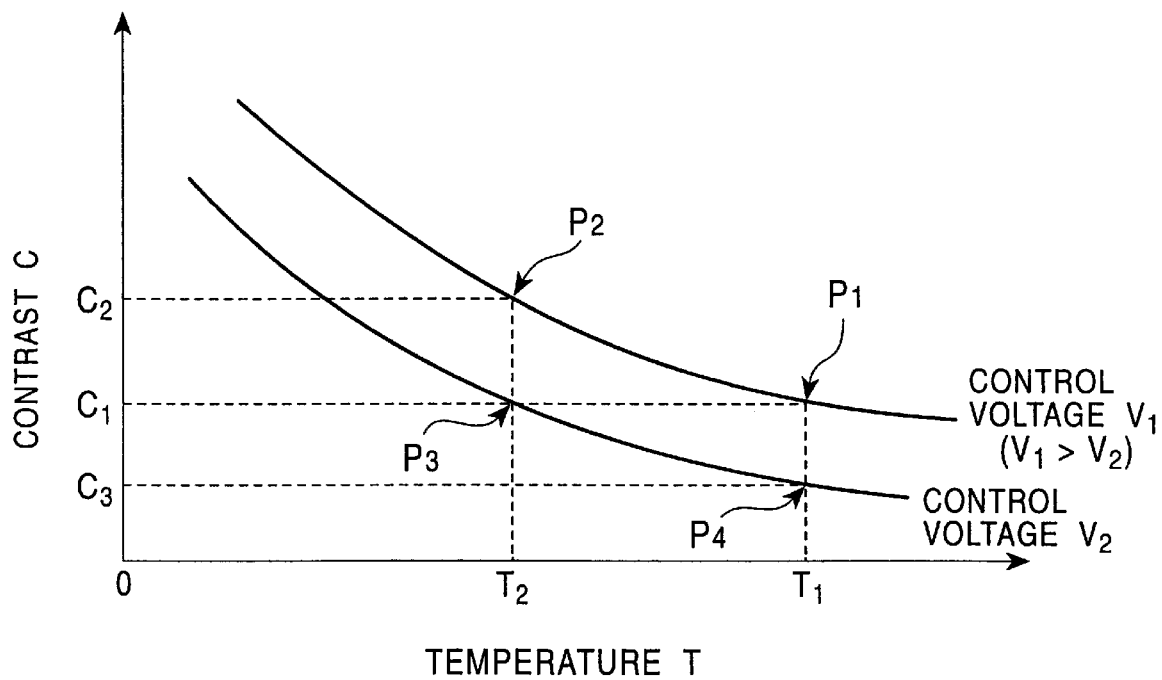
FIG. 2 is a graph showing the relationship between the contrast and temperature of a display unit in the image display device shown in FIG. 1 when the temperature is constant.

The relationship between the temperature and contrast is as shown in FIG. 2 where a liquid crystal display is employed as the display unit 4. When a constant control voltage is supplied to the display unit 4, the contrast decreases in accordance with an increase in the temperature. When the temperature is constant, the contrast decreases in accordance with a decrease in the control voltage.

Wen a standard contrast $C_1$ is obtained for a constant control voltage $V_1$ supplied to the display unit 4 whose temperature is $T_1$, as the temperature falls from $T_1$ to $T_2$, the contrast increases from $C_1$ (corresponding to a point $P_1$) to $C_2$ (corresponding to a point $P_2$). To obtain the contrast $C_1$ at the temperature $T_2$, a new control voltage $V_2$, which is lower than the control voltage $V_1$, must be supplied to the display unit 4.

On the contrary, when the standard contrast $C_1$ is obtained for the constant control voltage $V_2$ supplied to the display unit 4 whose temperature is $T_2$, as the temperature rises from $T_2$ to $T_1$, the contrast decreases from $C_1$ (corresponding to a point $P_3$) to $C_3$ (corresponding to a point $P_4$). To obtain the contrast $C_1$ at the temperature $T_1$, a new control voltage $V_1$, which is higher than a control voltage V2, must be supplied.

As described above, to obtain a new control voltage supplied to the display unit 4, the ROM 3 has prestored data indicating, as shown in a curve "A" of FIG. 3, the relationship between temperature of the display unit 4 and control voltage corresponding to standard contrasts (for example, the contrast C1) which cause an image displayed on the display unit 4 to be the most preferable contrast at the temperature (the prestored data is hereinafter referred to as "temperature/control-voltage characteristic data").

In order to maintain the most preferable contrast $C_1$, the curve "A" shows that when a temperature of the display unit 4 is $T_{10}$ (corresponding to the point $P_3$), a control voltage must be $V_{10}$ (corresponding to a point $P_5$) whereas when the temperature is $T_{20}$ (corresponding to a point $P_6$), a control voltage must be $V_{20}$ (corresponding to the point $P_6$).

As shown in FIG. 2, when a control voltage $V_1$ is supplied to the display unit 4 whose temperature is $T_1$, as the temperature of the display unit 4 falls from $T_1$ to $T_2$, the contrast increases from $C_1$ (corresponding to the point $P_1$) to $C_2$ (corresponding to the point $P_1$). The detected temperature $T_2$ is input, through the temperature sensor 1 and the A/D converter 5, to the CPU 6.

Figure 3:
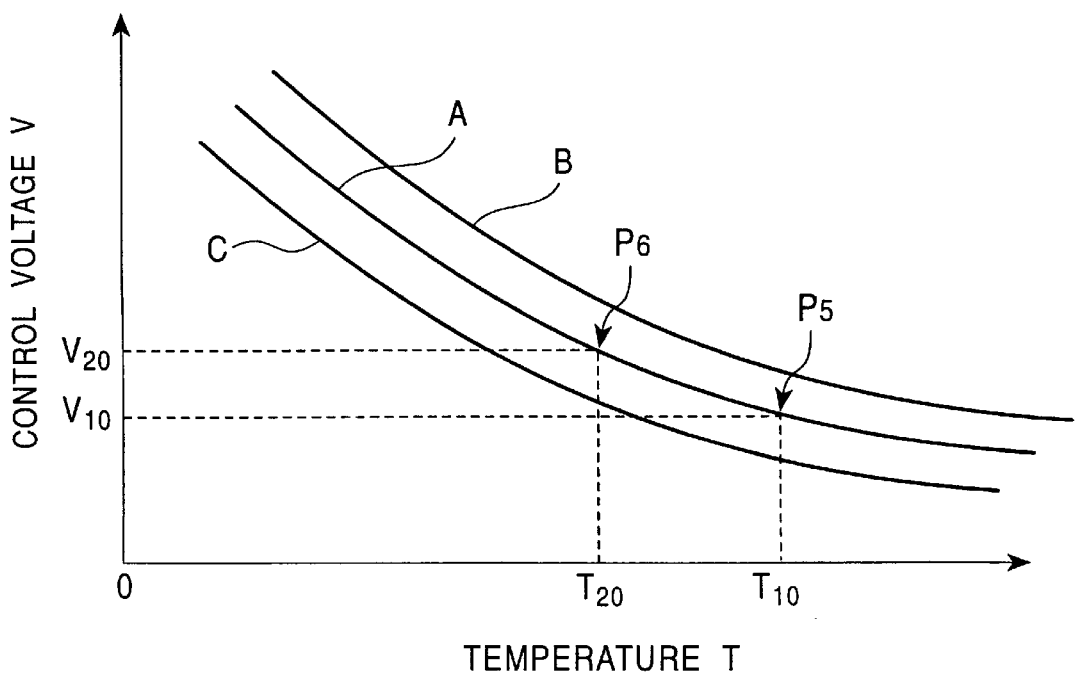
FIG. 3 is a graph showing data prestored in a storage device of the image display device shown in FIG. 1 which illustrates the relationship between the control voltage and the temperature of the display unit so as to obtain the most preferable contrast of an image displayed on the display unit and the relationship between the control voltage and the temperature of the display unit after manual modification so as to obtain the most preferable contrast of the image displayed on the display unit.

In accordance with the curve "A" in FIG. 3 indicating the temperature/control-voltage characteristic data prestored in the ROM 3, the CPU 6 finds a control voltage $V_{20}$ corresponding to a temperature $T_{20}$ which is equivalent to the detected temperature $T_2$ input to the CPU 6, and outputs the data of the control voltage $V_{20}$ to the contrast adjusting unit 7.

By causing the contrast adjusting unit 7 to supply a new control voltage $V_2$ to the display unit 4, based on the data of the input control voltage $V_{20}$, the contrast adjusting unit 7 is controlled so that the display unit 4 has the contrast $C_1$ (corresponding to the point $P_3$).

On the contrary, as shown in FIG. 2, when the control voltage $V_2$ is supplied to the display unit 4 whose temperature is $T_2$, as the temperature of the display unit 4 rises from $T_2$ to $T_1$, the contrast decreases from $C_1$ (corresponding to the point $P_1$) to $C_3$ (corresponding to the point $P_4$). The detected temperature $T_1$ is input, through the temperature sensor 1 and the A/D converter 5, to the CPU 6.

In accordance with the curve "A" in FIG. 3 indicating temperature/control-voltage characteristic data prestored in the ROM 3, the CPU 6 finds a control voltage $V_{10}$ corresponding to a temperature $T_{10}$ which is equivalent to the detected temperature $T_1$ input to the CPU 6, and outputs the data of the control voltage $V_{10}$ to the contrast adjusting unit 7.

By causing the contrast adjusting unit 7 to supply a new control voltage $V_1$ to the display unit 4 in response to the input control voltage $V_{10}$, the contrast adjusting unit 7 is controlled so that the display unit 4 has the contrast $C_1$ (corresponding to the point $P_3$).

The contrast of the image display device depends on the preference of each user.

Accordingly, the CPU 6 is connected to the manually adjusting operation unit 8 for manually adjusting the contrast. For example, in order to display an image on the display unit 4 with more distinct contrast than that obtained in accordance with the temperature/control-voltage characteristic data as shown by the curve "A" of FIG. 3, the contrast is increased as follows: By pressing the push button switch 8a in the manually adjusting operation unit 8, the CPU 6 modifies the temperature/control-voltage characteristic data read from the ROM 3; and the curve "A" is shifted to a curve "B" of FIG. 3 in accordance with the modified temperature/control-voltage characteristic data.

After the above manual modification, the CPU 6 finds a control voltage corresponding to a temperature which is equivalent to a detected temperature input to the CPU 6 in accordance with the temperature/control-voltage characteristic data indicated by the curve "B" in FIG. 3 prestored in the ROM 3, and outputs the data of the control voltage to the contrast adjusting unit 7.

At this point, as shown in FIG. 3, a higher control voltage is supplied to the display unit 4 than the one according to the temperature/control-voltage characteristic data indicated by the curve "A".

Likewise, for example, in order to display an image on the display unit 4 with less distinct contrast than that obtained in accordance with the temperature/control-voltage characteristic data as shown by the curve "A" of FIG. 3, the contrast is reduced as follows: By pressing the push button switch 8b in the manually adjusting operation unit 8, the CPU 6 modifies the temperature/control-voltage characteristic data read from the ROM 3; and the curve "A" is shifted to a curve "C" of FIG. 3 in accordance with the modified temperature/control-voltage characteristic data.

The CPU 6 finds a control voltage corresponding to a temperature which is equivalent to the detected temperature input to the CPU 6 in accordance with the temperature/control-voltage characteristic data indicated by the curve "C" in FIG. 3 prestored in the ROM 3, and outputs the data of the control voltage to the contrast adjusting unit 7.

At this point, as shown in FIG. 3, a lower control voltage is supplied to the display unit 4 than the one supplied to the display unit 4 according to the temperature/control-voltage characteristic data indicated by the curve "A".

Therefore, even though the user can adjust the contrast of the display unit 4 to his or her preferred level, the contrast of the display unit 4 can be maintained by automatic adjustment.

Figure 4:
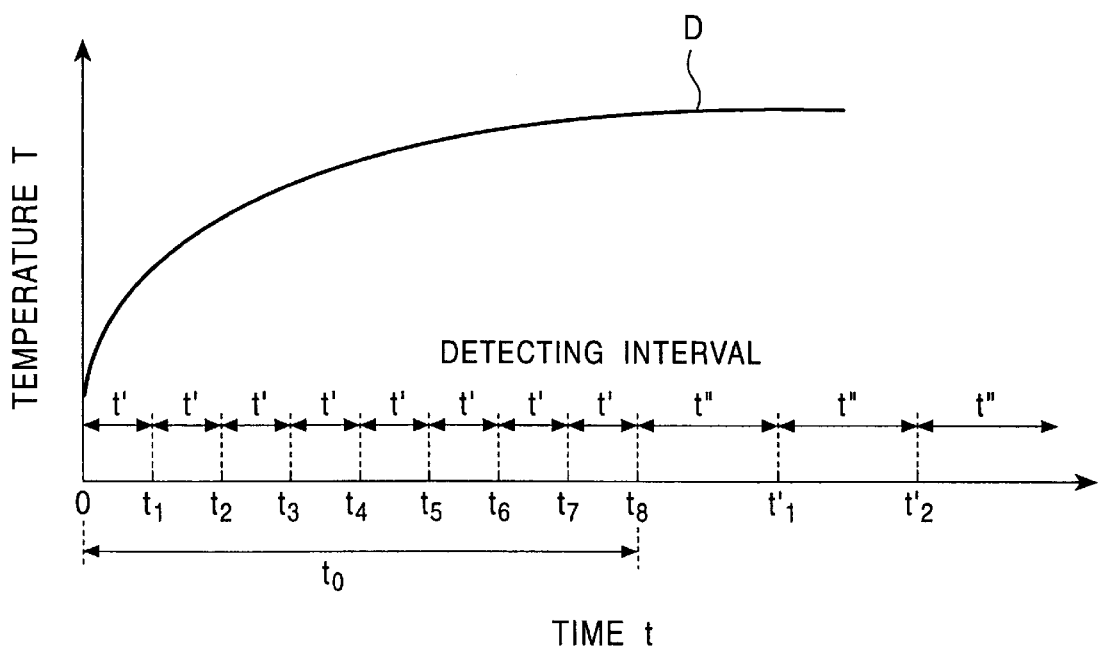
FIG. 4 is a graph showing the relationship between temperature and input times of temperatures of the display unit in the image display contrast adjusting device of the present invention.

As shown in a curve "D" of FIG. 4, the temperature of the display unit 4 rises rapidly for a predetermined period of time $t_0$ after power is supplied to the image display device. Subsequent to the predetermined period of time $t_0$, an increase in the temperature slows down. Because of this, for the predetermined period of time $t_0$ (for example, 10 minutes), the detected temperature is input from the A/D converter 5 to the CPU 6 at intervals of a first time interval t' (for example, 1 second).

In accordance with the temperature/control-voltage characteristic data indicated by the curve "A" or the like in FIG. 3 prestored in the ROM 3, the CPU 6 finds a control voltage $V_{10}$ corresponding to a temperature $T_{10}$ which is equivalent to the detected temperature $T_1$ of the display unit 4 sampled at times $t_1, t_2, \ldots$, and outputs the data of the control voltage $V_{10}$ to the contrast adjusting unit 7.

These actions above allow the contrast of the display unit 4 to be automatically adjusted for the predetermined period of time $t_0$ after the power is supplied to the image display device, even though the temperature of the display unit 4 rises rapidly.

Subsequent to the predetermined period of time $t_0$, as shown by the curve "D" of FIG. 4, since the temperature of the display unit 4 rises slowly, the detected temperature is input from the A/D converter 5 to the CPU 6 at each second time interval t" (for example, 20 seconds) which is longer than the first time interval t'.

Likewise, in accordance with the temperature/control-voltage characteristic data indicated by the curves in FIG. 3 prestored in the ROM 3, the CPU 6 finds a control voltage $V_{10}$ corresponding to a temperature $T_{10}$ which is equivalent to the detected temperature $T_1$ of the display unit 4 sampled at times of $t'_1, t'_2, \ldots$, and outputs the data of the control voltage $V_{10}$ to the contrast adjusting unit 7.

Subsequent to the predetermined period of time $t_0$ from the start of supplying power to the image display device, because the temperature of the display unit 4 increases slowly, the power consumption of the CPU 6 can be reduced by the input of the sensed temperature to the CPU 6 at each second time interval t" which is longer than the first time interval t'.

Even after the predetermined period of time $t_0$, a rapid temperature change may occur to an image display device such as a notebook-sized personal computer when the image display device is carried outdoors, for example.

Therefore, a standard temperature difference ΔT is prestored in the ROM 3 for being compared with each temperature difference between the detected temperatures sampled at times of $t_1, t_2 \ldots$, and the detected temperatures just prior to the current when the detected temperature is input to the CPU 6 at each second time interval t", as described above.

Figure 5:
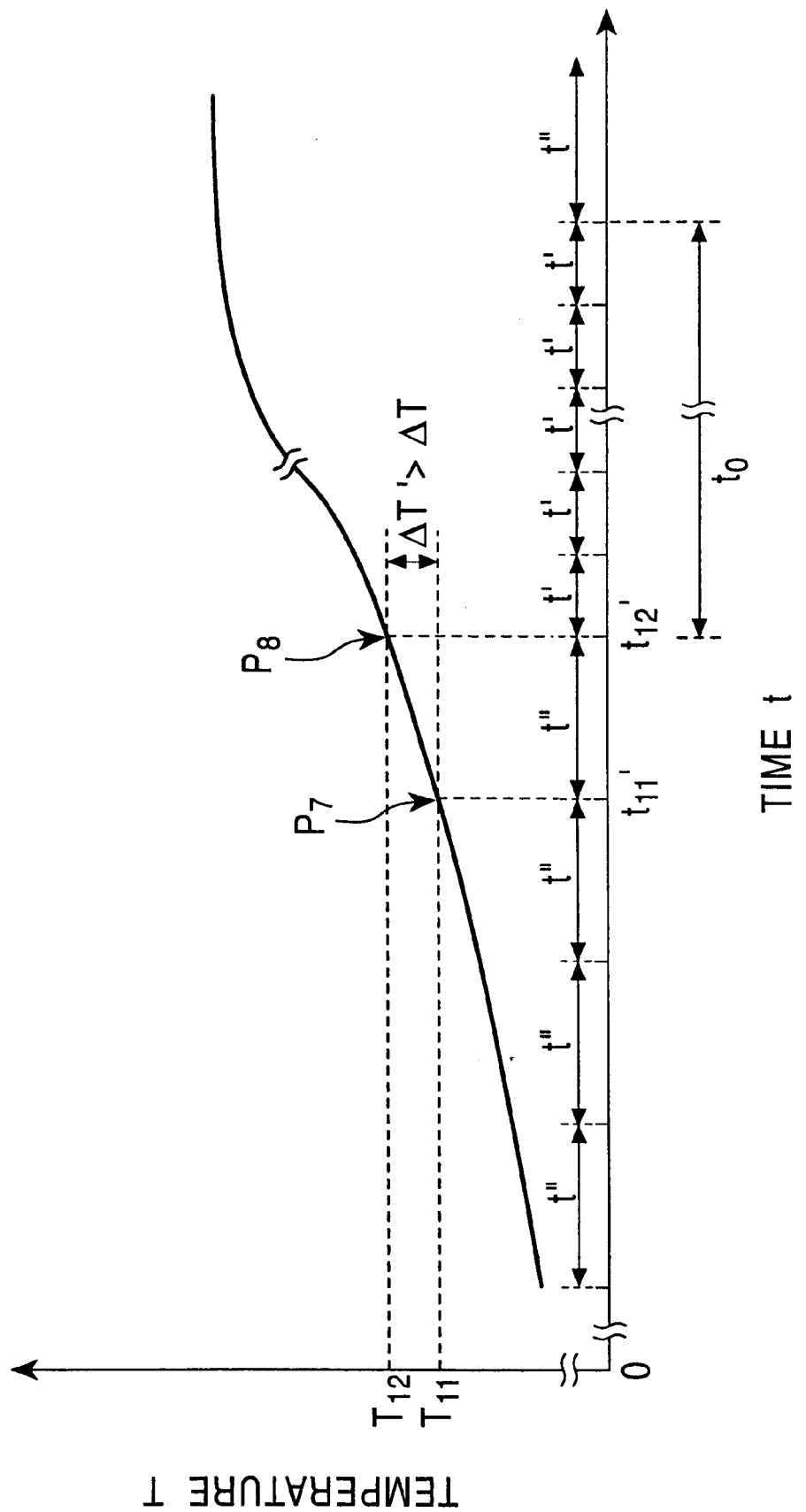
FIG. 5 is a graph showing the relationship between detected temperature and input times of the image display contrast adjusting device of the present invention after a predetermined period of the time, in which a temperature difference between temperatures obtained at two consecutive sampled points is greater than a standard temperature difference.
Figure 6:
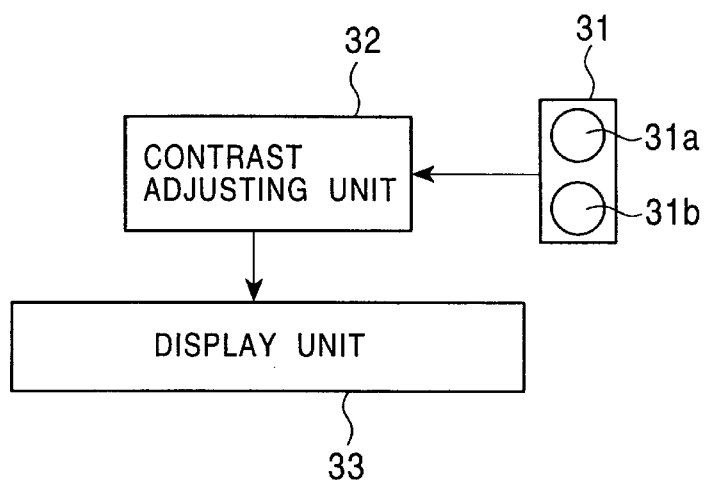
FIG. 6 is a block diagram of a conventional image display device.
Figure 7:
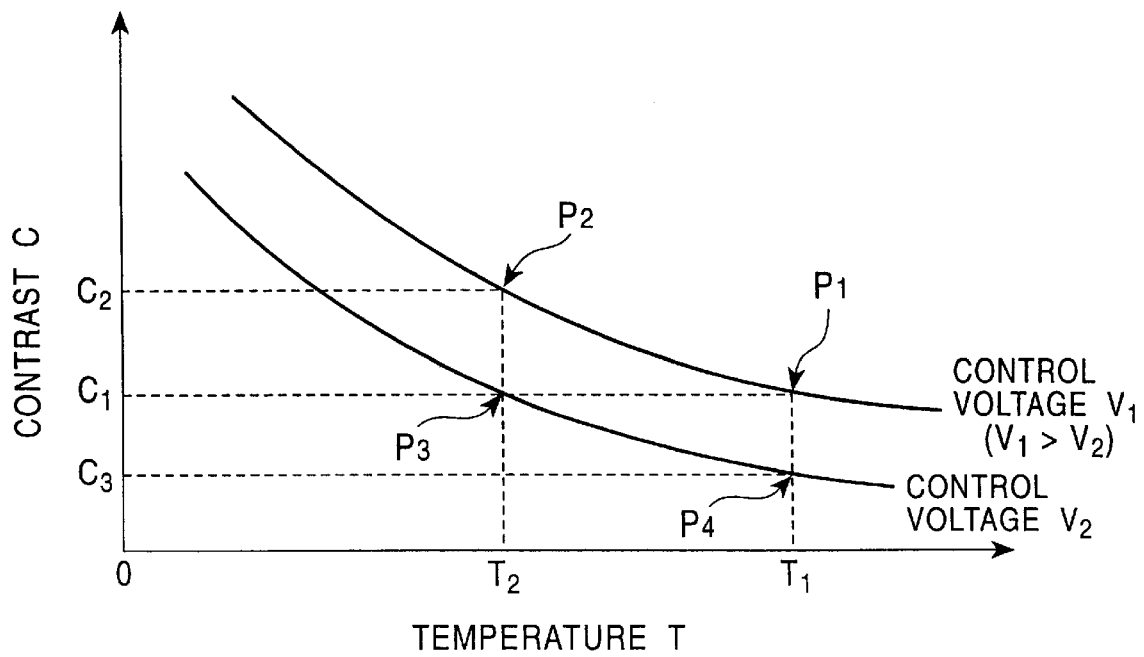
FIG. 7 is a graph showing the relationship between contrast and temperature of the display unit in the conventional image display device under a constant control voltage.

As shown in FIG. 5, for example, when a temperature difference ΔT between a temperature $T_{11}$ sampled at time $t_{11}'$ and a temperature $T_{12}$ sampled at time $t_{12}'$ is greater than the standard temperature difference $\Delta T$, the CPU 6 receives the detected temperature from the A/D converter 5 at each first time interval t' during the predetermined period of time $t_0$ from input time $t_{12}'$.

Subsequent to the predetermined period of time $t_0$, the CPU 6 causes the detected temperature to be input again at each second time interval t". When a temperature difference $\Delta T'$ obtained at this point is still greater than the standard temperature difference $\Delta T$, the detected temperature is input to the CPU 6 once again at intervals of the first time interval t' for another predetermined period of time t0 while comparing a temperature difference with the standard temperature difference in the same way as described above.

Although the ROM 3 is provided outside of the CPU 6 in this embodiment, the ROM 3 may be built in the CPU 6 (not shown) where the above data indicating the relationship between temperatures of the display unit 4 and control voltages corresponding to standard contrasts is prestored.

What is claimed is:

1. An image display device comprising:

a temperature sensor;

control means to which detected temperatures obtained by said temperature sensor are input, said control means controlling an input time interval of the detected temperatures while adjusting a contrast of an image displayed on a display unit; and a storage unit;

wherein said storage unit stores data representing the relationships between control voltages and the temperatures of said display unit under said control voltages for optimizing said contrast of an image, wherein said control means acquires the detected temperatures from said temperature sensor at each first time interval for a predetermined period of time subsequent to the start of supplying power to said display unit, and supplies said display unit with the control voltages corresponding to temperatures which are equivalent to the acquired temperatures, and which are represented by the data stored in said storage unit, and, wherein after said predetermined period of time, the detected temperatures are acquired at each second time interval longer than each first time interval.

2. An image display device according to claim 1, wherein a predetermined standard temperature difference is stored in said storage unit, and wherein when the detected temperatures are input from said temperature sensor to said control means at each second time interval, and a temperature difference between a presently detected temperature at each input time and the temperature detected just before the presently detected temperature is greater than said standard temperature difference, the detected temperature is immediately input to said control means at each first time interval for said predetermined period of time.

3. An image display device according to claim 1, wherein said control means includes a manually adjusting operation unit for manually adjusting said contrast of an image, wherein said manually adjusting operation unit modifies data representing the relationships between the control voltages and the temperatures of said display unit under said control voltages for optimizing said contrast of an image, thereby supplying said display unit with the control voltages corresponding to temperatures which are equivalent to the acquired temperatures and which are represented by the modified data stored in said storage unit which represents the relationships between said control voltages and the temperatures of said display unit under said control voltages for optimizing said contrast of an image.

* * * * *